(12) United States Patent
Colson et al.

(10) Patent No.: US 9,026,657 B2
(45) Date of Patent: May 5, 2015

(54) METHOD AND SYSTEM FOR PROVISIONING TELECOMMUNICATION SERVICES AND EQUIPMENT USING SEQUENTIAL OR PARALLEL PROCESSING

(75) Inventors: Jay H. Colson, Coopersburg, PA (US); Michael A. Bellomo, Somerville, NJ (US)

(73) Assignee: Synchronoss Technologies, Inc., Bridgewater, NJ (US)

( * ) Notice: Subject to any disclaimer, the term of this patent is extended or adjusted under 35 U.S.C. 154(b) by 499 days.

(21) Appl. No.: 12/959,608

(22) Filed: Dec. 3, 2010

(65) Prior Publication Data

US 2012/0144037 A1 Jun. 7, 2012

(51) Int. Cl.
*G06F 13/00* (2006.01)
*H04W 4/00* (2009.01)
*G06F 9/50* (2006.01)
*G06Q 10/06* (2012.01)

(52) U.S. Cl.
CPC ............. *H04W 4/001* (2013.01); *G06F 9/5038* (2013.01); *H04W 4/00* (2013.01); *G06Q 10/0631* (2013.01)

(58) Field of Classification Search
CPC ................... H04L 29/08072; H04L 29/08171; H04L 12/5695; H04L 29/06; H04L 29/08144; G06F 9/5038; H04W 4/001
USPC .......................................................... 709/226
See application file for complete search history.

(56) References Cited

U.S. PATENT DOCUMENTS

| | | | |
|---|---|---|---|
| 6,594,285 B1 * | 7/2003 | Kaiser | 370/522 |
| 2005/0268300 A1 | 12/2005 | Lamb et al. | |
| 2007/0198628 A1 | 8/2007 | Bates et al. | |
| 2010/0064357 A1 | 3/2010 | Baird et al. | |

OTHER PUBLICATIONS

Stephen Gunther, "EP Application No. 11 19 1591 Search Report", Apr. 4, 2012, Publisher: EPO, Published in: DE.

* cited by examiner

*Primary Examiner* — Robert B Harrell
(74) *Attorney, Agent, or Firm* — Kaplan Breyer Schwarz & Ottesen, LLP

(57) ABSTRACT

The delay in provisioning telecommunication services and equipment via a network is reduced significantly by performing substantially all of the provisioning processes sequentially on a single server. That is, through the counterintuitive approach of using sequential processing on a single server rather than parallel processing on a plurality of servers, the time required to provision telecommunication services and equipment is reduced. Preferably, telecommunication services and equipment are provisioned through a network by classifying the orders to be provisioned as two types. When the order is of a first type, the provisioning processes are performed on a set of servers (shared), and when the order is of a second type, substantially all of the provisioning processes are performed on a single server.

4 Claims, 2 Drawing Sheets

METHOD AND SYSTEM FOR PROVISIONING TELECOMMUNICATION SERVICES AND EQUIPMENT USING SEQUENTIAL OR PARALLEL PROCESSING

BACKGROUND OF THE INVENTION

The present invention relates generally to telecommunication services and the like, and more particularly, concerns a network-based method and system for provisioning of such services and equipment.

It is today commonplace for telecommunication services and equipment to be ordered on a network, whether online or at a service center and whether by a consumer directly or through a service agent. Moreover, it is not uncommon for the same network to handle the services and equipment of multiple telecommunication providers, completing the necessary communications to provide a consumer with the specific services and equipment he desires.

FIG. 1 is a schematic diagram illustrating the architecture of a typical, existing telecommunication provisioning network 10. Although the network is illustrated as having three server nodes for convenience of description, it is not uncommon for a network to have many more. Moreover, although a server node is often thought of as a separate computer, it is actually a computer program that offers specific services to a client program. Thus, those skilled in the art will appreciate multiple server nodes may run on a single high speed computer. When the term "server", it will be understood not to refer to separate computer, unless otherwise stated.

Each server node has a gateway providing access to the node, a scheduler which schedules tasks to be performed, and a workflow processor which actually performs those tasks in an order and at a time controlled by the scheduler. It should be kept in mind that telecommunication provisioning will typically require completion of several processes or workflows for any single telecommunication provisioning procedure and that those workflows must often be performed in a specific order. That is, certain workflows must be completed before others can be undertaken.

For purposes of example, it will be assumed that land line service is being ordered by or on behalf of a customer. When an order is initiated basic information is obtained from about the customer, including where he lives, after which provisioning begins. An Order Request 12 is received by the gateway and an auto-response 14 is sent by the gateway to the customer. The first process, workflow 1 is assigned to the first available server node, in this case, node 2. Workflow 1 might for example be an inquiry to the telecommunications provider whether wire-line service is available to this customer. The task is placed in the scheduler and, typically after some delay, the communication to the telecommunication provider's database is made, a response is received, and the customer's order is updated with the results. With workflow 1 completed, workflow 2 may be undertaken and it is assigned to the next available server node, in this case node 3, where the scheduler schedules a process, workflow 2. This process may, for example be an inquiry regarding whether fiber service is available to this customer. The process is cued by the scheduler in server node 3 and, after some delay, the workflow processor in server node 3 accesses the appropriate database of the telecommunication service provider, receives a response, and the customer's order is updated.

At this point, it becomes possible to undertake workflow 3, which may for example be an inquiry for the telecommunication service provider's wire-line equipment catalog, to permit selection of appropriate equipment. This task is assigned to the next available server node, in this case node 1, for scheduling. After some delay, the workflow processor completes workflow 3, the requested information is received, and the customer's order is updated.

As a practical matter, the customer's order is maintained in a separate database. Each communication with the telecommunication service provider involves a delay in accessing the order database, a delay before a workflow is undertaken, a delay in awaiting the completion of the workflow, and a delay in storing the results of a workflow in the order database. When a customer has already placed an order that it is merely being fulfilled on his behalf, such delays are not of concern. However, if the customer is placing an order in real time, that is, he is awaiting its completion, the accumulated delays represent a considerable inconvenience or annoyance to the customer and become unacceptable.

There a need therefore exists in the prior art to substantially reduce the delay encountered in provisioning telecommunications services and equipment via a network.

In accordance with one aspect of the present invention, the delay in provisioning telecommunication services and equipment via a network can be reduced significantly by performing substantially all of the provisioning processes sequentially on a single server. That is, through the counterintuitive approach of using sequential processing on a single server rather than parallel processing on a plurality of servers, the present invention reduces the time required to provision telecommunication services and equipment.

In accordance with another aspect of the present invention, telecommunication services and equipment are provisioned through a network by classifying the orders to be provisioned as two types. When the order is of a first type, the provisioning processes are performed on a set of servers (shared), and when the order is of a second type, substantially all of the provisioning processes are performed on a single server.

BRIEF DESCRIPTION OF THE DRAWINGS

The foregoing brief description and further objects, features and advantages of the present invention will be understood more completely from the following detailed description of the presently preferred, but nonetheless illustrative embodiments in accordance with the present invention, with reference being had to the accompanying drawings, in which.

DETAILED DESCRIPTION OF THE PREFERRED EMBODIMENTS

Figure 1:
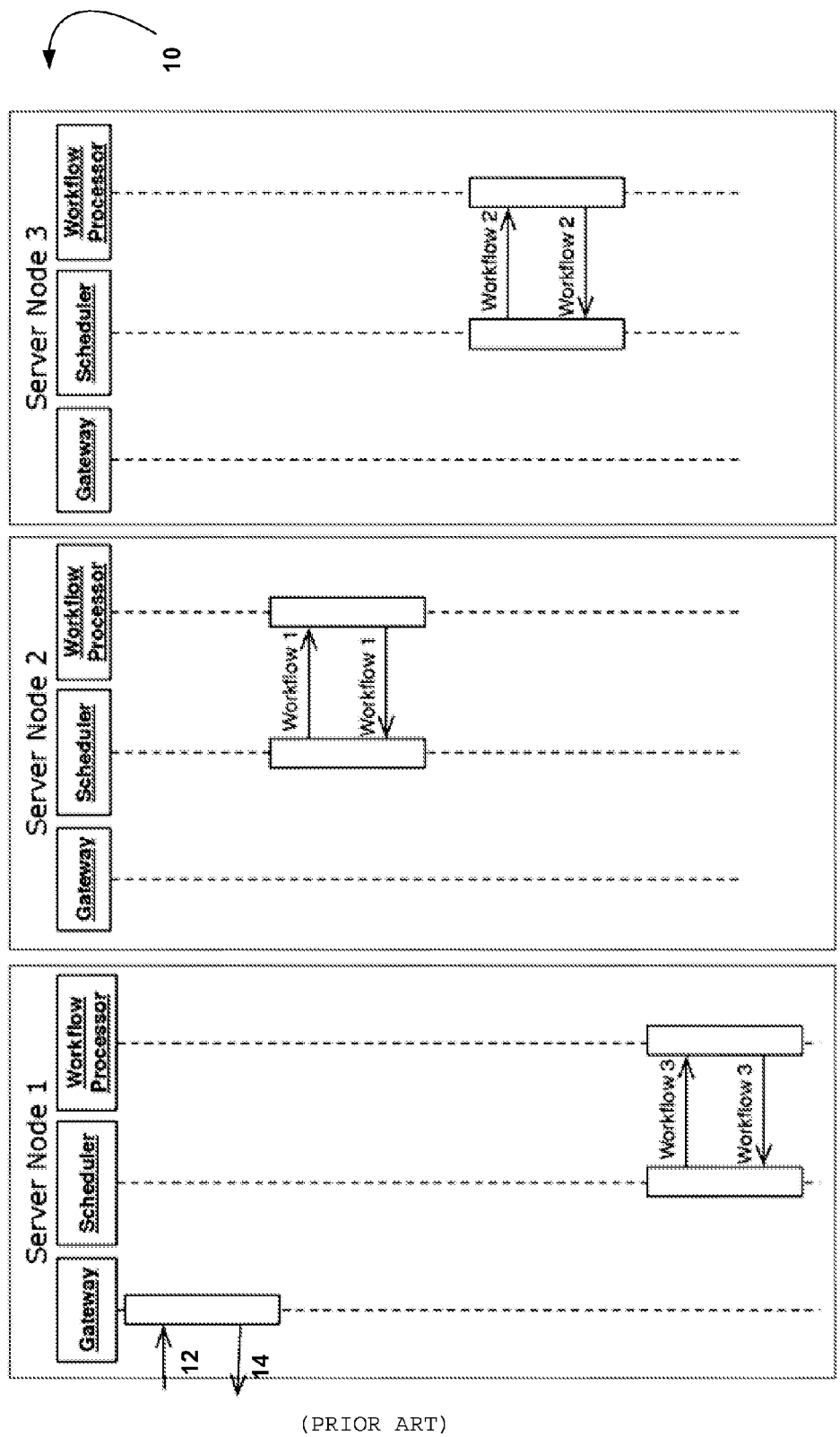
FIG. 1 is a schematic diagram illustrating the architecture of a typical, existing telecommunication provisioning network.
Figure 2:
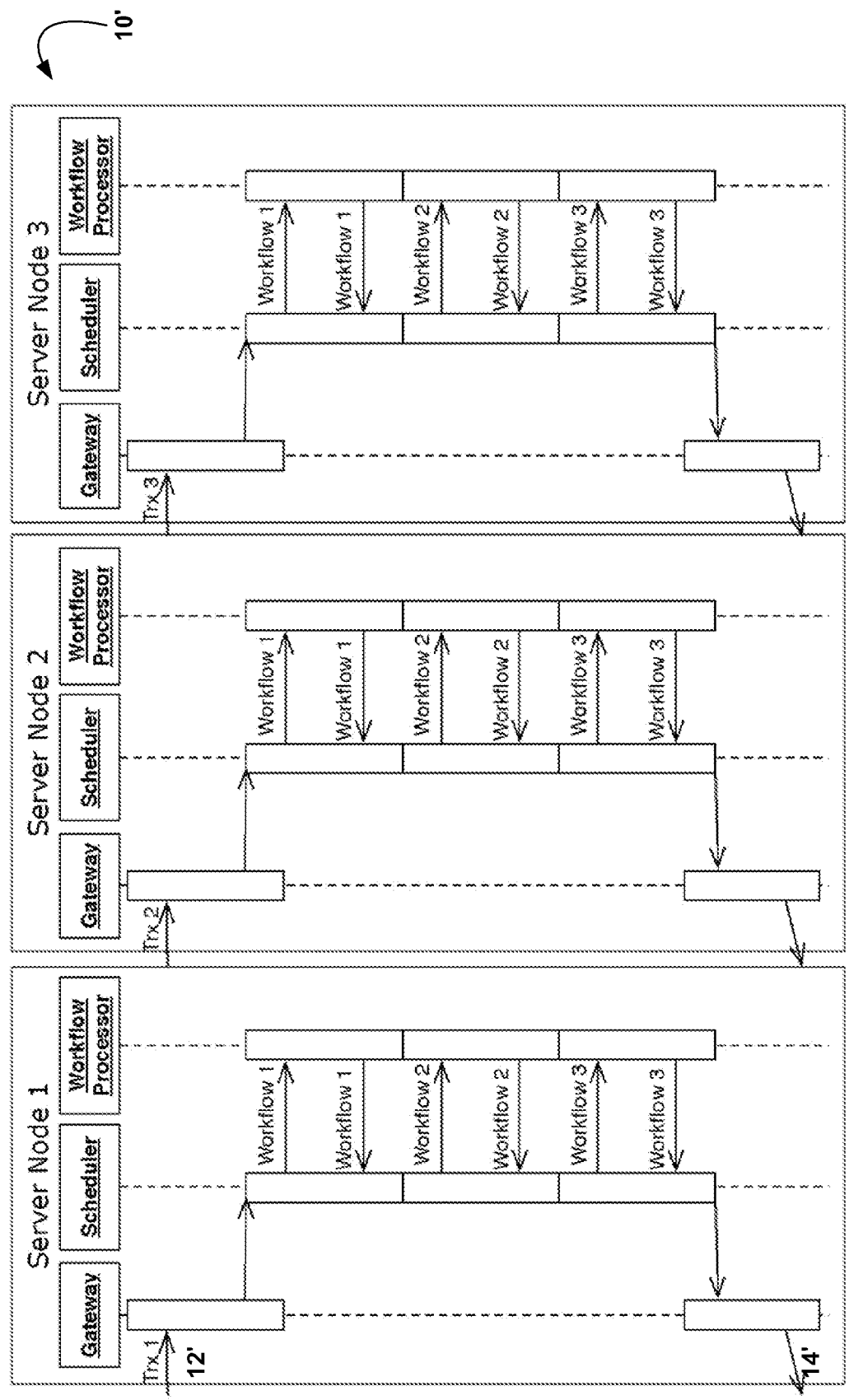
FIG. 2 is a schematic diagram illustrating the architecture of a telecommunication provisioning network embodying the present invention.

FIG. 2 is a schematic diagram illustrating the architecture of a telecommunication provisioning network 10' embodying the present invention. The network 10' is illustrated as having three server nodes, for convenience of description, but it is not uncommon for a network to have many more. The components in each server node are the same as the components of the server nodes in FIG. 1. However, as explained below, the server nodes operate differently.

It will be assumed that server node 1 is performing a task Trx1 which is the same task being performed in FIG. 1, made up of three workflows. Server node 2 and server node 3 are performing entirely unrelated tasks. An Order Request 12' is received by the gateway in node 1, but it is now handled differently. All the sequential workflows are assigned to node 1 and are scheduled for sequential execution by its scheduler. For example, upon receiving a response from the workflow processor as to workflow 1, the scheduler saves the result and immediately begins workflow 2, and so forth. Upon completion of all workflows, the customer's order is updated in the associated database and the gateway sends a response 14' back to the user. Thus the task at hand is completed without delay between workflows and without a delay during workflows associated with accessing the customer's order database. As a result, the customer's order is provisioned much more quickly and, in particular, quickly enough to process a waiting customer's order without inconvenient delays.

In accordance with an aspect of the present invention, a network of the type illustrated in FIG. 1 is enhanced by adding one or more server nodes of type illustrated in FIG. 2. The new types of server nodes can be used for service in real time provisioning transactions during which a user is actually waiting for results, whereas the conventional server nodes may be used to service transactions in which there is no user waiting.

Although preferred embodiments of the invention have been disclosed for those purposes, those skilled in the art will appreciate that many additions, modifications, and substitutions can be made without departing from the scope and spirit of the invention as defined by the accompanying claims.

What is claimed:

1. A system comprising:
a controller, wherein the controller receives, in real-time, an order to provision telecommunication services and equipment over a network;
wherein the controller is constructed to determine whether the order is of a first-category order or a second-category order;
wherein the controller is constructed to execute, in parallel on each of a plurality of servers in real-time, a set of provisioning processes when the order is determined to be the first-category order;
wherein the controller is constructed to execute, in real-time and sequentially on a single server on the network, substantially the set of provisioning processes when the order is determined to be the second-category type;
wherein the set of provisioning processes is sequentially executed by the single server as follows:
  (i) receiving, by a scheduler, the order;
  (ii) transmitting, by the scheduler, a first workflow to a workflow processor;
  (iii) receiving, by the scheduler, a first response to the first workflow from the workflow processor;
  (iv) saving, by the scheduler, the first response received from the workflow processor;
  (v) transmitting, by the scheduler, a second workflow to the workflow processor;
  (vi) receiving, by the scheduler, a second response to the second workflow from the workflow processor; and
  (vii) saving, by the scheduler, the second response received from the workflow processor; and
wherein, upon completion of the first workflow and the second workflow, updating the order in a database.

2. The system of claim 1 wherein the controller is constructed to handle information related to services or equipment involving telecommunications.

3. The system of claim 1 wherein the second-category order is transmitted by a customer that is awaiting completion of the order in real-time.

4. The system of claim 1 wherein the first-category order is transmitted by a customer that is not awaiting completion of the order in real-time.

* * * * *